Oct. 25, 1960

W. VUTZ ET AL 2,957,407

HAY BALERS

Filed Dec. 19, 1957

INVENTORS
WILHELM VUTZ &
EARL E. KOCH

Joseph Allen Brown
ATTORNEY

Oct. 25, 1960 W. VUTZ ET AL 2,957,407
HAY BALERS
Filed Dec. 19, 1957 2 Sheets-Sheet 2
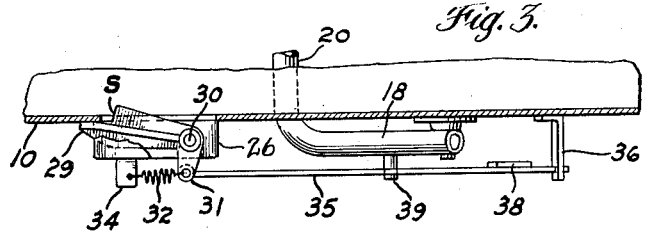
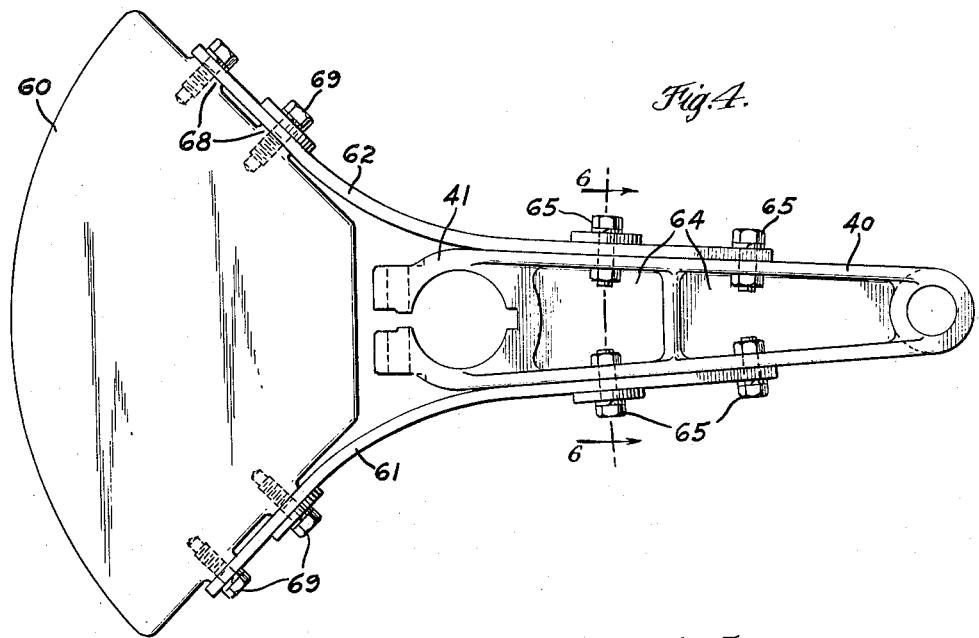
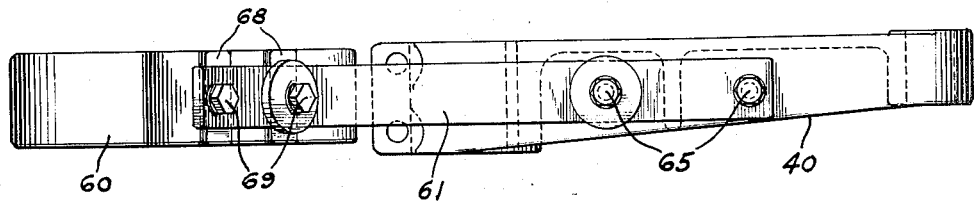
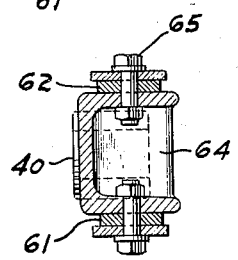
INVENTORS
WILHELM VUTZ &
EARL E. KOCH
Joseph Allen Brown
ATTORNEY

United States Patent Office 2,957,407
Patented Oct. 25, 1960

2,957,407

HAY BALERS

Wilhelm Vutz, New Holland, and Earl E. Koch, Mohnton, Pa., assignors to Sperry Rand Corporation, New Holland, Pa., a corporation of Delaware Filed Dec. 19, 1957, Ser. No. 703,881

3 Claims. (Cl. 100—19)

This invention relates to improvements in the construction and operation of automatic hay balers of the type employing a recirprocating plunger, as shown for example in Nolt U.S. Patent No. 2,750,877, issued June 19, 1956.

An inherent characteristic of balers of the reciprocating plunger type is a rocking motion in the direction of plunger travel. These plungers travel at speeds of from approximately 40 to 100 strokes per minute. Although such a plunger is built as light as possible, because of its rapid reciprocation it produces substantial inertia forces and the mass of the baler is generally insufficient to absorb the forces without an appreciable back-and-forth motion with each working and return stroke of the plunger. On balers pulled by tractors, the rocking motion is often transmitted to the tractor, and amplitudes of as high as one inch back-and forth motion of the tractor itself is not uncommon. Since the coupling between tractor and baler is, conventionally, relatively loose, the motion of the baler is still greater.

The problem is more profound on balers of the self-propelled type, where, because of the relatively light chassis and the direct coupling of the baler to the chassis, the back-and-forth rocking action can become quite annoying to the operator, especially at the lower travel speeds of the baler. Amplitudes of three to four inches have been observed to occur on some balers at zero travel speed.

Another characteristic of the modern baler is its rapid operation. Tying mechanisms for banding bales after they are completed must work at high speed and in very small time intervals. In many balers, the needle mechanism for delivering a tying medium around the end of a completed bale is operated between successive working strokes of the baler plunger. The drive means for the plunger and the needle mechanism are operated in time. However, it sometimes occurs that the timing becomes disrupted. For example, a drive chain for operating the needle mechanism may break in which case the needle mechanism will stop but the plunger will keep on reciprocating. If the needles of the needle mechanism stop while extending through the bale case of the baler, the plunger on its next stroke will strike the needles damaging the baler. To protect against such an eventuality, many balers are provided with a safety device which comprises a stop member which is engaged by the plunger if it moves on a working stroke while the needles of the needle mechanism are in the bale case and in the path of the plunger. Engagement of a plunger with such a safety device generally produces severe impact loads on the plunger drive and on the frame of the baler. However, damage is often prevented or at least minimized by the introduction of shear bolts, slip clutches or the like into the drive.

A primary object of this invention is to provide means for reducing the rocking motion of balers of the character described.

Another object of this invention is to accomplish such a reduction in rocking with a structure which is inexpensive to manufacture and easy to assemble.

A further object of this invention is to provide means which reduces rocking in a reciprocable plunger type baler having a needle safety device, such reduction in rocking being accomplished without producing an undesirable result when the safety device of the baler is placed in operation.

Other objects of this invention will be apparent hereinafter from the specification and from the recital in the appended claims.

In the drawings:

Fig. 3 is a fragmentary plan view showing the safety device in operative position;

Fig. 4 is an enlarged side elevation showing the plunger drive means and the device of this invention mounted thereon;

Fig. 5 is a side view of Fig. 4; and

Fig. 6 is a section taken on the line 6—6 of Fig. 4 and looking in the direction of the arrows.

Figure 1:
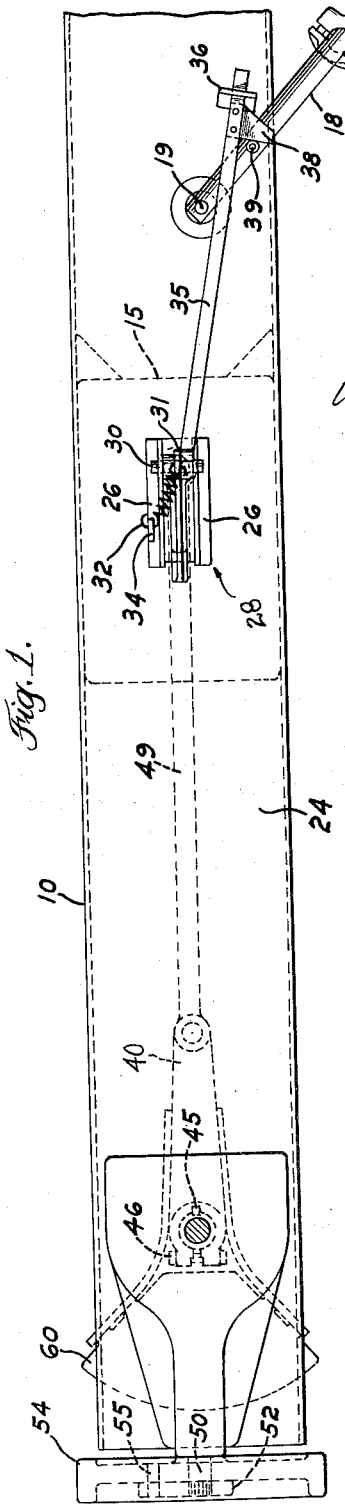
Fig. 1 is a fragmentary side elevation of a portion of an automatic hay baler showing a needle mechanism, a safety device operative in conjunction with the needle mechanism, and a plunger, including the drive therefor, such drive incorporating a device constructed according to this invention for reducing the rocking of the baler imparted by the reciprocation of the plunger.

Referring now to the drawings by numerals of reference, 10 denotes the bale case of an automatic baler. It will be understood that such bale case is mounted on a wheel supported frame, a portion of which is shown at 11. When the baler is moved across a field of cut and windrowed hay, suitable conventional mechanism picks up the hay and delivers it to a feeding mechanism extending laterally along one side of the bale case. Such feeder mechanism, not shown, deposits the crop material in the bale case 10 through an opening 12 in one vertical side wall 14 thereof. A plunger 15 reciprocable in the bale case along the longitudinal axis of the case and past opening 12 operates to compress the hay into bales.

After each bale is completed, it is banded by any conventional twine or wire tying apparatus. Conventionally, such apparatus includes a needle mechanism for passing a tying medium across the bale case, from one side of the case to the opposite side thereof. An example of such a mechanism is shown at 16.

The needle mechanism comprises a needle yoke 18 which straddles the vertical side walls of the bale case, being pivotally supported at 19 on these side walls. The bight portion 20 of the yoke carries a pair of arcuate needles 21 projectable through slots 22 in bale case 10 whereby the needles may pass from one side of the bale case to the opposite side, and then return.

Figure 2:
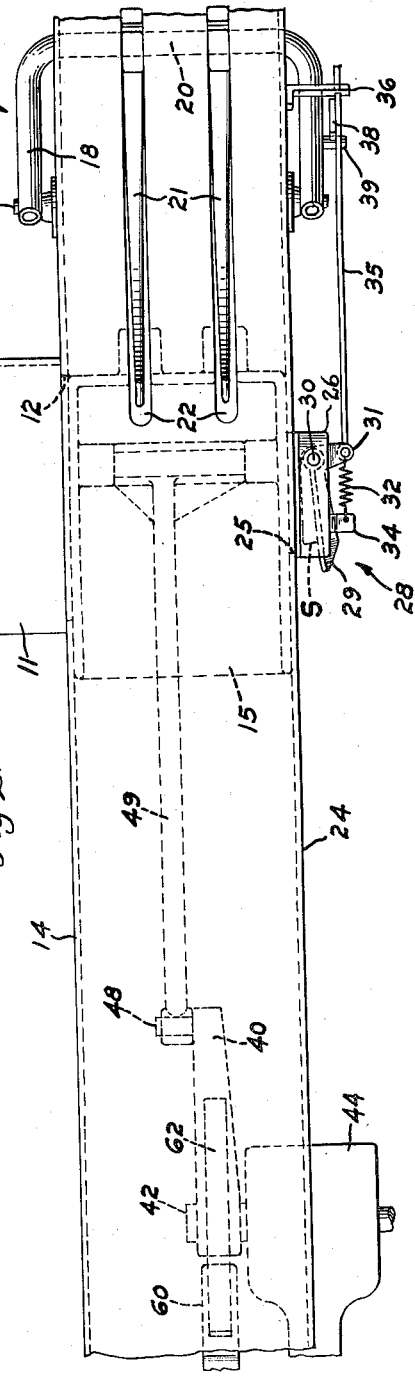
Fig. 2 is a plan view of Fig. 1.

The vertical side wall of the bale case remote from the feeder mechanism, namely wall 24, is provided with an elongate slot 25 (Fig. 2). Extending above and below slot 25 and projecting outwardly from the side wall 24 are support brackets 26 on which a needle safety device 28 is carried. Safety device 28 comprises a stop member 29 pivotally supported on a pin 30 carried on brackets 26. Stop 29 is in the form of a bell crank, having a leg 31 to which one end of a spring 32 is connected. The other end of spring 32 is connected to an ear 34 projecting from one of the brackets 26. Spring 32 tends to pivot stop 29 in a clockwise direction, when the stop is viewed as shown in Figs. 2 and 3. However, such pivoting action is normally restrained by a link arm 35 connected to leg 31 and extending through a combination guide and support bracket 36 affixed to the side 24 of the bale case 10 and adjacent the yoke of the needle mechanism. Link 35 has a projecting plate 38 connected to it. Plate 38 is engageable by a roller 39 carried on the adjacent leg of the needle yoke. When the needle mechanism is operated and pivoted clockwise from the position shown in Fig. 1, the roller 39 is moved away from engagement with the plate 38 and spring 32 is able to become effective to shift link 35 longitudinally and pivot stop 29 about pin 30. When this occurs, the stop moves from the position shown in Fig. 2 to the position shown in Fig. 3, wherein a nose portion S on the stop projects into the bale case and into the path of reciprocation of the plunger 15. When the needles return, the roller 39 engages plate 38 shifting link 35 back to original position and pivoting stop 29 back to the position shown in Fig. 2.

In Figs. 1 and 2, the plunger 15 is shown at the end of a working or outward stroke. The plunger is adapted to be withdrawn from this position towards the left of Figs. 1 and 2 and then subsequently returned to the right. During each stroke, the plunger moves across the opening 12 in the side of the bale case.

Plunger 15 is reciprocated by means of a crank arm 40 having a bored and split end 41 which is mounted on the output shaft 42 of a gear box 44. Shaft 42 is keyed at 45 (Fig. 1) to the crank arm, the end 41 of the arm being detachably held in place by fastening means 46. The opposite end of the crank arm has a laterally projecting pivot shaft 48 to which one end of a connecting rod 49 is connected. The opposite end of the connecting rod is suitably pivotally connected to the plunger 15.

It will be apparent that when the crank arm 40 is rotated, the plunger 15 will be reciprocated. The plunger is guided in its reciprocable movements through engagement with the insides of the side walls of the bale case, particularly the bottom thereof.

Gear box 44 receives power through an input shaft 50, Fig. 1. Rigidly affixed to the outer end of input shaft 50 is a crank arm 52 connected to a fly wheel 54 through a shear pin 55. The fly wheel 54 is rotated from a power source, not shown. Such may be through a suitable power-take-off connection to the tractor which tows the baler or, the baler may be provided with its own power source. If the baler is of the self-propelled type, the power plant of the vehicle may be employed to drive the fly wheel.

All of the structure thus far recited is generally conventional and plays no part in the present invention, per se. Such structure merely provides the environment of applicants' improvement which will now be described.

When the baler is in operation, with plunger 15 reciprocating to compress the hay into bales, the plunger will move at considerable speed. As previously stated such speed may be in the range of from 40 to 100 strokes per minute. Because of the plunger mass and its rapid reciprocation inertia forces are produced which subject the baler to back-and-forth rocking motion. To oppose such inertia forces of the plunger, there is connected to crank arm 40 a counterweight 60. Such counterweight is of considerable mass, approximating and opposing the mass of the plunger 15. In one baler installation, it has been found desirable to employ a counterweight weighing 120 pounds.

As shown best in Fig. 4, counterweight 60 is resiliently supported on a pair of leaf springs 61 and 62 which straddle crank arm 40. Portions of the crank arm are U-shaped in cross-section, Fig. 6. Such structure provides pockets 64 whereby nuts and bolts 65 may be passed through the sides of the crank arm and used for fastening the leaf springs thereto. Counterweight 60 is of truncated configuration, the cut off end of the counterweight facing the crank arm. The leaf springs 61 and 62 fan outwardly and are connected to the counterweight by bolts 69. Suitable elevations or bosses 68 are provided on the counterweight to reduce to a minimum the machining required to provide flat surfaces to which the leaf springs can be fastened.

*Operation*

Because of the disposition of counterweight 60, the inertia forces of plunger 15 are opposed. The tendency of the baler to rock back and forth in the direction of reciprocation of the plunger is thus reduced. During the ordinary operation of the baler, the counterweight remains disposed in a given position relative to crank arm 40, and whether the weight is fixedly connected to the crank arm or resiliently mounted, as shown, is of no consequence. However, if the timing of the plunger relative to the operation of the needle mechanism becomes disrupted, then the fact that the counterweight is resiliently carried is of major importance.

Should the operation of the needle mechanism and the plunger get out of time, the safety device 28 comes into play. For example, if the needle mechanism stops after the needles 21 have been extended across bale case 10 and before they have returned, the plunger would crash into the needles but for device 28. However, when needles 21 are in bale case 10, stop 29 is likewise in the case. If the needles fail to retract before the next plunger stroke, the plunger will engage the nose S of stop 29 and be arrested.

When plunger 15 is stopped by device 28, connecting rod 49, crank arm 40 and gear box 44 are likewise stopped. The force of the fly wheel 54 is then directed against shear pin 55, which snaps, thereby breaking the drive to the plunger.

As far as the plunger drive is concerned, damage to the baler on stopping of the plunger is prevented by shear pin 55. However, the shear pin is unable to take care of the momentum of the counterweight, and on stopping of the plunger by device 28 the full inertia of the counterweight would be directed toward the plunger tending to force it through device 28. The counterweight could cause serious damage to the baler gear box, the safety device and other parts. However, because of the resilient mounting of the counterweight, the weight is able to overrun the stopping of the plunger, the leaf springs providing sufficient elastic travel to transmit the inertia forces of the counterweight to the baler frame and in a long enough time interval to reduce these forces to acceptable limits.

The structure employed by applicants is simple, inexpensive to manufacture and inexpensive to assemble. The counterweight reduces the vibrations of the baler, whether such baler is of the trail behind type or self-propelled. Because of the resilient mounting of the counterweight, the kinetic energy of the counterweight is aborbed upon stopping of the plunger.

While this invention has been described in connection with a particular embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as fall within the scope of the invention or the limits of the appended claims.

Having thus described our invention, what we claim is:

1. In an automatic baler, a frame, a bale case mounted on said frame, a plunger within said bale case, a crank arm, drive means connected to said crank arm for rotating the arm, means connecting said crank arm to said plunger whereby when the crank arm is rotated the plunger is reciprocated, a needle mechanism operable in timed relation to said plunger, said needle mechanism including one needle, at least, movable across the path of travel of said plunger from one side of said bale case to the opposite side thereof and then returning between successive strokes of the plunger in one direction, a safety device for stopping said plunger should said needle mechanism get out of timing with said plunger and the plunger move in said one direction while said one needle is in its path, means for disconnecting said drive means from said crank arm upon stopping of said plunger by said safety device, counterweight means, and means connecting said counterweight means to said crank arm in such a position that the inertia forces developed on reciprocation of said plunger are opposed, said counterweight connecting means including a resilient support substantially deflectable when subjected to inertia forces of said counterweight means on stopping of said plunger by said safety device, whereby the subsequent stopping of the counterweight means will be over a sufficient distance to achieve a transmission of the inertia forces developed to said baler frame and in a long enough time interval to reduce the forces to acceptable limits.

2. In an automatic baler, a frame, a bale case mounted on said frame, a plunger within said bale case, a crank arm, drive means connected to said crank arm for rotating arm, means connecting said crank arm to said plunger whereby when the crank arm is rotated the plunger is reciprocated, a needle mechanism operable in timed relation to said plunger, said needle mechanism including one needle, at least, movable across the path of travel of said plunger from one side of said bale case to the opposite side thereof and then returning between successive strokes of the plunger in one direction, a safety device for stopping said plunger should said needle mechanism get out of timing with said plunger and the plunger move in said one direction while said one needle is in its path, means for disconnecting said drive means from said crank arm upon stopping of said plunger by said safety device, a counterweight, and one resilient member at least supporting said counterweight spaced from said crank arm and in a normal position wherein the counterweight opposes the inertia forces of said plunger, said resilient member being substantially deflectable when subjected to inertia forces of said counterweight on stopping of said plunger by said safety device, whereby the subsequent stopping of the counterweight means will be over a sufficient distance to achieve a transmission of the inertia forces developed to said baler frame and in a long enough time interval to reduce the forces to acceptable limits.

3. In an automatic baler, a bale case, a plunger within said bale case, a crank arm, drive means connected to one end of said crank arm for rotating the arm, means connecting the opposite end of said crank arm to said plunger whereby when the crank arm is rotated the plunger is reciprocated, a needle mechanism operable at the completion of each bale and in timed relation to said plunger, said needle mechanism including one needle, at least, movable across the path of travel of said plunger from one side of said bale case to the opposite side thereof and then returning between successive strokes of said plunger in one direction, a stop member for stopping said plunger, means for projecting said stop member into said bale case when the needle of said needle mechanism is in the path of reciprocation of said plunger, means for disconnecting said drive means from said crank arm upon stopping of said plunger by said stop member, a counterweight, a pair of leaf springs, each of said leaf springs having one end connected to said one end of said crank arm and an opposite end connected to said counterweight, said pair of leaf springs resiliently supporting said counterweight spaced from said one end of said crank arm in a normal position such that the counterweight opposes the inertia forces of said plunger and being deflectable from said normal position by inertia forces of said counterweight upon stopping of said plunger by said stop member.

References Cited in the file of this patent
UNITED STATES PATENTS

| | | |
|---|---|---|
| 1,401,715 | McCorquodale | Dec. 27, 1921 |
| 1,756,898 | Bocz | Apr. 29, 1930 |
| 2,622,507 | Hitchcock et al. | Dec. 23, 1952 |
| 2,651,252 | Pope | Sept. 8, 1953 |
| 2,665,631 | Paul | Jan. 12, 1954 |